United States Patent [19]

Markovs

[11] Patent Number: 4,738,993

[45] Date of Patent: Apr. 19, 1988

[54] RIM MICROCELLULAR POLYURETHANE ELASTOMER EMPLOYING HETERIC OR INTERNAL BLOCK ETHYLENE OXIDE POLYOLS

[75] Inventor: Robert A. Markovs, Grosse Ile, Mich.

[73] Assignee: BASF Corporation, Parsippany, N.J.

[21] Appl. No.: 790,290

[22] Filed: Oct. 22, 1985

[51] Int. Cl.$^4$ .................... C08G 18/00; C08G 18/10
[52] U.S. Cl. .................................. 521/163; 521/914; 528/64
[58] Field of Search ................ 521/163, 914, 163; 528/64

[56] References Cited

U.S. PATENT DOCUMENTS

| | | | |
|---|---|---|---|
| 3,824,199 | 7/1974 | Nadeau et al. | 260/2.5 |
| 4,239,857 | 12/1980 | Harper | 521/121 |
| 4,243,760 | 1/1981 | McDaniel et al. | 521/176 |
| 4,298,701 | 11/1981 | Meyborg et al. | 521/51 |
| 4,385,133 | 5/1983 | Alberino et al. | 521/159 |
| 4,581,386 | 4/1986 | Taylor et al. | 521/163 |

*Primary Examiner*—John Kight
*Assistant Examiner*—Dennis R. Daley
*Attorney, Agent, or Firm*—Norbert M. Lisicki

[57] ABSTRACT

A RIM polyurethane elastomer prepared by reacting an organic polyisocyanate, a polyoxyalkylene polyether polyol, and a chain extender. The polyol contains from about 7 weight percent to about 40 weight percent ethylene oxide either as a block or a heteric structure.

8 Claims, No Drawings

RIM MICROCELLULAR POLYURETHANE ELASTOMER EMPLOYING HETERIC OR INTERNAL BLOCK ETHYLENE OXIDE POLYOLS

BACKGROUND OF THE INVENTION

1. Field of the Invention

This invention relates to the preparation of a reaction injection molded (RIM) microcellular polyurethane elastomer. It more particularly relates to the preparation of a reaction injection molded polyurethane elastomer employing heteric or internal block ethylene oxide polyols.

2. Description of the Prior Art

The automotive industry is faced with legislative mandates which require continued improved fuel economy. In order to achieve these higher fuel economy goals, the automotive industry has downsized large vehicles. Furthermore, the automotive industry has investigated the use of lower weight materials. Among the types of materials which may be employed are those produced by reaction injection molded polyurethanes. In order for these products to meet the demanding requirements for their application. they must be sufficiently rigid to be self supporting, have thermal dimensional stability to allow for normal processing operations at elevated temperatures, have low coefficients of thermal expansion, have a class A surface and good paintability, and enjoy good impact characteristics at low temperatures.

U.S. Pat. No. 3,892,691 teaches the preparation of polyurethane products employing quasi prepolymers of diphenylmethanediisocyanate and dipropylene glycols together with a polypropylene ether triol such as is prepared by the reaction of ethylene and propylene oxide with trimethylolpropane or glycerol and the use of the chain extender 1,4-butanediol.

U.S. Pat. No. 4,243,760 teaches the preparation of reaction injection molded polyurethane products by employing chain extending agents such as ethylene glycol. propylene glycol and 1,4-butanediol.

U.S. Pat. No. 4,102,833 also teaches the preparation of reaction injection molded urethanes by employing long chain polyols together with a short chain diol or triol such as ethylene glycol or glycerol.

The prior art also teaches the use of diethyltoluenediamine as a chain extender instead of ethylene glycol or butanediol.

U.S. Pat. No. 4,379,105 teaches the preparation of polyurethane elastomers employing a mixture of ethylene oxide tipped and propylene oxide tipped polyoxyalkylene polyether polyols.

SUMMARY OF THE INVENTION

This invention comprises a reaction injection molded (RIM) polyurethane elastomer having improved flowability during molding comprising the reaction product of an organic polyisocyanate, a polyoxyalkylene polyether polyol, and a chain extender wherein the polyether polyol contains a heteric or internal ethylene oxide block structure of about 7 weight percent to about 40 weight percent, based on the total weight of the polyol.

DETAILED DESCRIPTION OF THE INVENTION

Polyurethane compositions used in making reaction injection molded polyurethane elastomers are prepared in the usual manner using conventional techniques.

The invention comprises the reaction product of an organic polyisocyanate, a polyoxyalkylenepolyether polyol consisting of propylene oxide or butylene oxide, and ethylene oxide and a chain extender wherein the polyether polyol has a molecular weight range from about 2000 to about 6000 The polyether polyol consists of either a heteric or an internal ethylene oxide block structure containing from about 7 weight percent to about 40 weight percent ethylene oxide based on the total weight of the polyol.

The chain extending agent may be chosen from a wide variety of chain extenders which include ethylene glycol, propylene glycol, 1,4-butanediol, glycerine, amino alcohols, substituted toluene diamines such as 3,5-diethyltoluenediamine or mixtures thereof. The preferred chain extenders are ethylene glycol, butanediol, and 3,5-diethyltoluenediamine. The concentration of chain extender may range from about 10 weight percent to about 30 weight percent based on the total weight of polyol and chain extender. The preferred range is from 15 percent to 25 percent based on the total weight of polyol and chain extender. The concentration of polyol would thus range from 90 percent to 70 percent, preferably from 85 percent to 75 percent based on the total weight of polyol and chain extender.

Representative polyols which may be employed in the RIM process include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 6000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, b-hydromuconic acid, a-butyl-a-ethyl-glutaric acid, a,b-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, a-methyl glucoside, pentaerythritol, sorbitol and sucrose. Also included within the term "polyhydric alcohol" are compounds derived from phenol such as 2,2'-bis(4,4'-hydroxyphenyl)propane, commonly known as Bisphenol A.

Any suitable polyoxyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Those preferred are the ethylene, propylene and butylene oxide adducts of ethylene glycol, propylene glycol, butylene glycol, glycerol, 1,1,1-trimethylolpropane, 1,1,1trimethylolethane, 1,2,6-hexanetriol, a-methyl-glucoside, pentaerythritol, sorbitol, 2,2'-(4,4'-hydroxyphenyl)propane and sucrose, and mixtures thereof with equivalent weights from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters Thus, polyester amides may be obtained by condensing an amino alcohol such as ethanolamine with the Polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol: and alkyne thiols such as 3-hexyne-1.6-dithiol.

Suitable amines which may be condensed with alkylene oxides include aromatic amines such as aniline, ochloroaniline, p-aminoaniline, 1, 5-diaminonaphthalene, methylenedianiline. the condensation products of aniline and formaldehyde. and 2,4-diaminotoluene: aliphatic amines such as methylamine, triisopropanolamine, ethylenediamine, 1,3diaminopropane, 1,3-diaminobutane. and 1,4-diaminobutane.

Other polyoxyalkylene polyether polyols which may be employed are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference, or (3) by low temperature polymerization in the presence of chain transfer agents. These polymerizations may be carried out at a temperprture between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. Nos. 3,652,659 and Re. 29,014 may be employed in preparing the graft polymer dispersions used in the instant invention, the disclosures of which are incorporated by reference Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557, the disclosures of which are incorporated by reference. Preferred polyhydroxyl-containing phosphorus compounds are prepared from alkylene oxides and acids of phosphorus having a $P_2O_5$ equivalency of from about 72 percent to about 95 percent.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, a-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl a-chloroacrylate, ethyl a-ethoxyacrylate, methyl a-acetaminoacrylate, butyl acrylate, 2-ethylhexyl acrylate, phenyl acrylate, phenyl methacrylate, a-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(b-chloroethyl) vinylphosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for us in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, di-a-cumyl peroxide, dipropyl peroxide, diisopropyl peroxide, isopropyl-t-butyl peroxide, butyl-t-butyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, amethylbenzyl hydroperoxide, a-methyl-a-ethyl benzyl hydroperoxide, tetralin hydroperoxide, triphenylmethyl hydroperoxide, diphenylmethyl hydroperoxide, a-a'-azo-bis(2-methyl) butyronitrile, a,a'-azo-bis(2-methyl) heptonitrile, 1,1'-azo-bis (1-cyclohexane) carbonitrile, dimethyl a,a'-azobis(isobutyronitrile), 4,4'-azo-bis(4-cyanopetanoic) acid, azo-bis(isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-t-butylazo-2-cyanobutane, 1-cyano-1-(t-butylazo)cyclohexane, t-butyl peroxy-2-ethylhexanoate, t-butylperpivalate, 2,5-dimethyl-hexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally, from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

In this invention the polyols employed are polyoxyalkylene polyether polyols consisting of propylene or butylene oxide and ethylene oxide wherein the ethylene oxide is either as a heteric or internal block with a propylene or butylene oxide terminated structure. As used herein, the term heteric means the addition of a mixture of ethylene oxide and either propylene oxide or butylene oxide in such a ratio that the terminal groups of the chain are either propylene oxide or butylene oxide. The condensation of ethylene oxide employed may vary from about 7 weight percent to about 40 weight percent based on the weight of the polyol.

The RIM elastomers are generally prepared by the reaction of a polyoxyalkylene polyether polyol with an organic polyisocyanate optionally in the presence of additional polyhydroxyl-containing components, chain-extending agents, catalysts, surface-active agents, stabilizers, dyes, fillers such as milled glass fibers and pigments. Suitable processes for the preparation of cellular polyurethane plastics are disclosed in U.S. Reissue Pat. No. 24,514 together with suitable machinery to be used in conjunction therewith. It is also possible to proceed with the preparation of the polyurethane elastomers by a prepolymer technique wherein an excess of organic polyisocyanate is reacted in a first step with the polyol to prepare a prepolymer having free isocyanate groups which is then reacted in a second step with more polyol. Alternately, the components may be reacted in a single working step commonly known as the "one-shot" technique of preparing polyurethanes.

The organic polyisocyanate employed in the instant invention corresponds to the formula R'(NCO)z wherein R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl)sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 4,4'-cyclohexane diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-dimethyldiphenylmethane-4,4'-diisocyanate; the triisocyanates such as 4,4',4"-triphenylmethane triisocyanate, polymethylene polyphenylene polyisocyanate and 2,4,6-toluene triisocyanatate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the useable isocyanates are the modifications of the above isocyanates which contain carbodiimide, allophonate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound a determined by the well-known Zerewitinoff test, as described by Kohler in *Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Diphenylmethane diisocyanate is preferably used in the compositions of the present invention.

The parts given in the examples are by weight unless otherwise indicated. The following abbreviations are employed in the examples.

Polyol A—is a glycerine propylene oxide ethylene oxide adduct containing 15 weight percent ethylene oxide in the middle of the chain and having a hydroxyl number of 25.6.

Polyol B—is a glycerine propylene oxide ethylene oxide adduct containing 7 weight percent heteric ethylene oxide and having a hydroxyl number of 24.6

Polyol C—is a glycerine propylene oxide ethylene oxide adduct containing 15 weight percent heteric ethylene oxide and havinig a hydroxyl number of 24.6

Polyol D—is a glycerine butylene oxide ethylene oxide adduct containing 38 weight percent heteric ethylene oxide and having a hydroxyl number of 23.8.

Polyol E—is a propylene glycol butylene oxide ethylene oxide adduct containing 38 weight percent heteric ethylene oxide and having a hydroxyl number of 23.5.

Polyol F—is a glycerine propylene oxide adduct having a hydroxyl number of 23.5.

Catalyst A—is dibutyltin dilaurate complexed with hexahydro-1-(3,4,5,6-tetrahydro-7H-azepin-2y1)-1-H-azepin Catalyst B—is 25% triethylenediamine in butanediol.

Isocyanate A—is diphenylmethane diisocyanate modified with dipropylene glycol and polyoxypropylene glycol.

The following RIM procedure was employed.

PROCEDURE

An Elastogran Maschinenbau PUROMAT 30/2 was used to prepare Examples 1–24.

A 14 mm mixhead with a total material output of 450 g./sec. and shot times of 0.7 sec. were employed. A steel mold 9-½×11×0.125 in. heated to 65° C. with an external harp type aftermixer constituted the mold cavity. Standard component temperatures were 30° C. for the isocyanate side and 40° C. for the resin side. Two demold times were employed, 20 sec. and 60 sec. A corner of the plaque was bent 180° immediately upon demolding and the degree of surface cracking noted.

TABLE I

| | Example | | | | | |
|---|---|---|---|---|---|---|
| | 1 | 2 | 3 | 4 | 5 | 6 |
| Formulation | | | | | | |
| Polyol, 82.3 pbw | A | B | C | D | E | F |
| 3,5-Diethyltoluenediamine, pbw | 17.7 | → | → | → | → | → |
| Catalyst A, pbw | 0.1 | → | → | → | → | → |

TABLE I-continued

| | Example | | | | | |
|---|---|---|---|---|---|---|
| | 1 | 2 | 3 | 4 | 5 | 6 |
| Catalyst B, pbw | 0.5 | → | → | → | → | → |
| Isocyanate A, pbw/100 Resin | 46.9 | 46.7 | 46.7 | 46.4 | 51.2 | 46.9 |
| Index | 105 | → | → | → | → | → |
| Physical Properties | | | | | | |
| Density, Kg/M$^3$ | 1092.4 | 1081.2 | 1078.0 | 1087.6 | 1079.6 | 1073.2 |
| Tensil Strength, MPa | 11.31 | 7.91 | 8.60 | 19.31 | 11.31 | 9.40 |
| Elongation, % | 60.0 | 57.0 | 43.0 | 180.0 | 247.0 | 110.0 |
| Graves Tear, KN/M | 88.1 | 38.2 | 59.0 | 78.1 | 52.9 | 27.1 |
| Shore "D" Hardness | 46/44 | 39/36 | 43/40 | 45/43 | 38/33 | 35/32 |
| 121° C. Heat Sag, m.m. | 5.3 | 7.1 | 6.1 | 6.4 | 7.1 | ta 10.7 |
| Flexiblility Modulus, MPa | | | | | | |
| −29° C. | 235 | 80.6 | 150.9 | 166.7 | 130.9 | 51.7 |
| 22° C. | 137 | 48.9 | 82.0 | 84.8 | 57.9 | 31.7 |
| 70° C. | 86.0 | 39.3 | 58.6 | 68.2 | 40.0 | 27.6 |
| Ratio −29° C./70° C. | 2.73 | 2.06 | 2.56 | 2.45 | 3.26 | 1.86 |

TABLE II

| | Example | | | | | |
|---|---|---|---|---|---|---|
| | 1 | 2 | 3 | 4 | 5 | 6 |
| Formulation | | | | | | |
| Polyol, 82.3 pbw | A | B | C | D | E | F |
| 3,5-Diethyltoluenediamine, pbw | 17.7 | → | → | → | → | → |
| Catalyst A, pbw | 0.1 | → | → | → | → | → |
| Catalyst B, pbw | 0.5 | → | → | → | → | → |
| Isocyanate A, pbw/100 Resin | 46.9 | 46.7 | 46.7 | 46.4 | 51.2 | 46.9 |
| Index | 105 | → | → | → | → | → |
| Physical Properties | | | | | | |
| Density, Kg/M$^3$ | 1065.2 | 1078.0 | 1076.4 | 1076.4 | 1073.2 | 1042.8 |
| Tensile Strength, MPa | 11.11 | 6.92 | 7.59 | 16.90 | 14.47 | 9.18 |
| Elongation, % | 70 | 63 | 43 | 165 | 353 | 120 |
| Graves Tear, KN/M | 83.2 | 44.3 | 62.7 | 74.4 | 85.3 | 47.8 |
| Shore "D" Hardness | 47/44 | 38/37 | 42/39 | 44/43 | 41/39 | 34/33 |
| 121° C. Heat Sag, m.m. | 13.7 | 17.0 | 14.7 | 9.4 | 2.90 | 17.8 |
| Flexibility Modulus, MPa | | | | | | |
| −29° C. | 270.8 | 84.8 | 150.9 | 172.0 | 140.6 | 59.9 |
| 22° C. | 95.8 | 51.7 | 92.3 | 155.0 | 75.8 | 40.7 |
| 70° C. | 86.8 | 40.0 | 59.9 | 72.4 | 48.9 | 33.8 |
| Ratio −29° C./70° C. | 3.12 | 2.13 | 2.53 | 2.16 | 2.88 | 1.79 |

TABLE III

| | Example | | | | | |
|---|---|---|---|---|---|---|
| | 1 | 2 | 3 | 4 | 5 | 6 |
| Formulation | | | | | | |
| Polyol, 82.3 pbw | A | B | C | D | E | F |
| 3,5-Diethyltoluenediamine, pbw | 17.7 | → | → | → | → | → |
| Catalyst A, pbw | 0.1 | → | → | → | → | → |
| Catalyst B, pbw | 0.5 | → | → | → | → | → |
| Isocyanate A, pbw/100 Resin | 48.3 | 48.1 | 48.1 | 47.7 | 52.7 | 48.3 |
| Index | 108 | → | → | → | → | → |
| Physical Properties | | | | | | |
| Density, Kg/M$^3$ | 1086.0 | 1073.2 | 1079.6 | 1084.4 | 1084.4 | 1071.6 |
| Tensile Strength, MPa | 15.64 | 8.0 | 8.34 | 18.79 | 12.92 | 8.54 |
| Elongation, % | 150 | 83 | 40 | 137 | 220 | 90 |
| Graves Tear, KN/M | 80.9 | 37.3 | 45.9 | 84.6 | 62.5 | 46.6 |
| Shore "D" Hardness | 46/45 | 39/36 | 41/39 | 47/46 | 38/34 | 35/33 |
| 121° C. Heat Sag, m.m. | 6.8 | 13.0 | 10.7 | 6.6 | 17.5 | 11.4 |
| Flexiblility Modulus, MPa | | | | | | |
| −29° C. | 259 | 84 | 150 | 262 | 138 | 61 |
| 22° C. | 146 | 50 | 86 | 143 | 63 | 38 |
| 70° C. | 83 | 32 | 52 | 92 | 39 | 26 |
| Ratio −29° C./70° C. | 3.11 | 2.61 | 2.88 | 2.86 | 3.53 | 2.37 |

TABLE IV

| | Example | | | | | |
|---|---|---|---|---|---|---|
| | 1 | 2 | 3 | 4 | 5 | 6 |
| Formulation | | | | | | |
| Polyol, 82.3 pbw | A | B | C | D | E | F |
| 3,5-Diethyltoluenediamine, pbw | 17.7 | → | → | → | → | → |
| Catalyst A, pbw | 0.1 | → | → | → | → | → |

TABLE IV-continued

| | Example | | | | | |
|---|---|---|---|---|---|---|
| | 1 | 2 | 3 | 4 | 5 | 6 |
| Catalyst B, pbw | 0.5 | → | → | → | → | → |
| Isocyanate A, pbw/100 Resin | 45.6 | 45.4 | 45.4 | 45.1 | 49.8 | 45.6 |
| Index | 102 | → | → | → | → | → |
| Physical Properties | | | | | | |
| Density, Kg/M$^3$ | 1082.8 | 1078.0 | 1078.0 | 1081.2 | 1087.6 | 1070.0 |
| Tensile Strength, MPa | 10.54 | 10.51 | 8.80 | 18.22 | 10.42 | 8.91 |
| Elongation, % | 107.0 | 110.0 | 80.0 | 173.0 | 283.0 | 147.0 |
| Graves Tear, KN/M | 83.0 | 44.1 | 52.9 | 85.6 | 58.3 | 45.5 |
| Shore "D" Hardness | 44/41 | 37/32 | 44/38 | 47/43 | 35/31 | 32/30 |
| 121° C. Heat Sag, m.m. | 7.6 | 12.4 | 10.2 | 8.9 | 17.8 | 10.9 |
| Flexibility Modulus, MPa | | | | | | |
| −29° C. | 242 | 86 | 141 | 209 | 112 | 55 |
| 22° C. | 120 | 45 | 70 | 124 | 56 | 29 |
| 70° C. | 68 | 30 | 43 | 22 | 30 | 21 |
| Ratio −29° C./70° C. | 3.55 | 2.87 | 3.30 | 2.72 | 3.70 | 2.59 |

The embodiments of the invention in which an exclusive privilege or property is claimed are defined as follows:

1. A reaction injection molded microcellular polyurethane elastomer comprising the reaction product of an organic polyisocyanate, a polyoxyalkylene polyether polyol consisting of propylene oxide or butylene oxide, and ethylene oxide and a chain extender wherein said polyol has a molecular weight range from about 1000 to about 6000 and either a heteric or an internal ethylene oxide block structure containing from about 7 weight percent to about 40 weight percent ethylene oxide.

2. The elastomer of claim 1 wherein the chain extender is 3,5-diethyltoluenediamine.

3. The elastomer of claim 2 wherein the concentration of 3,5-diethyltoluenediamiine is from about 10 weight percent to about 30 weight percent based on the total weight of the polyol and the chain extender.

4. The elastomer of claim 1 wherein the organic polyisocyanate is diphenylmethane diisocyanate.

5. A process for the preparation of a reaction injection molded microcellular polyurethane elastomer comprising reacting an organic polyisocyanate, a polyoxyalkylene polyether polyol consisting of propylene oxide or butylene oxide and ethylene oxide and a chain extender wherein said polyol has a molecular weight range from about 1000 to about 6000 and either a heteric or a internal ethylene oxide block structure containing from about 7 weight percent to about 40 weight percent ethylene oxide.

6. The process of claim 5 wherein the chain extender is 3,5-diethyltoluenediamine.

7. The process of claim 6 wherein the concentration of 3,5-diethyltoluenediamine is from about 10 weight percent to about 30 weight percent based on the total weight of the polyol and the chain extender.

8. The process of claim 5 wherein the organic polyisocyanate is diphenylmethane diisocyanate.

* * * * *